(12) United States Patent
Standridge et al.

(10) Patent No.: US 7,738,468 B2
(45) Date of Patent: Jun. 15, 2010

(54) METHOD AND APPARATUS FOR PACKET TRAVERSAL OF A NETWORK ADDRESS TRANSLATION DEVICE

(75) Inventors: Aaron Standridge, Poteau, OK (US); Ken Erbes, San Carlos, CA (US); Remy Zimmerman, Belmont, CA (US); Philippe Depallens, Mountain View, CA (US)

(73) Assignee: Logitech Europe S.A. (CH)

( * ) Notice: Subject to any disclaimer, the term of this patent is extended or adjusted under 35 U.S.C. 154(b) by 731 days.

(21) Appl. No.: 11/088,030

(22) Filed: Mar. 22, 2005

(65) Prior Publication Data

US 2006/0215652 A1 Sep. 28, 2006

(51) Int. Cl.
*H04L 12/28* (2006.01)
*H04L 12/56* (2006.01)
*H04J 3/16* (2006.01)
*H04J 3/22* (2006.01)
*G06F 9/00* (2006.01)
*G06F 15/16* (2006.01)

(52) U.S. Cl. .......................... 370/401; 370/466; 726/11
(58) Field of Classification Search ................. 370/401, 370/466–467; 726/11
See application file for complete search history.

(56) References Cited

U.S. PATENT DOCUMENTS

| | | |
|---|---|---|
| 3,017,456 A | 1/1962 | Schreiber |
| 4,813,056 A | 3/1989 | Fedele et al. |
| 5,497,434 A | 3/1996 | Wilson |
| 5,528,284 A | 6/1996 | Iwami et al. |
| 5,592,225 A | 1/1997 | Kurobe |
| 5,740,278 A | 4/1998 | Berger et al. |
| 5,778,143 A | 7/1998 | Boyce |
| 5,790,180 A | 8/1998 | Wild |
| 5,990,852 A | 11/1999 | Szamrej |
| 5,991,308 A | 11/1999 | Fuhrmann et al. |
| 6,058,421 A | 5/2000 | Fijolek et al. |
| 6,061,739 A | 5/2000 | Reed et al. |
| 6,209,021 B1 | 3/2001 | Ahimovic et al. |

(Continued)

FOREIGN PATENT DOCUMENTS

EP 0763 944 A 3/1997

(Continued)

OTHER PUBLICATIONS

Rosenberg et al., "STUN - Simple Traversal of User Datagram Protocol (UDP) Through Network Address Translators (NATs)." Network Working Group, RFC 3489, p. 1-47, Mar. 2003.

(Continued)

*Primary Examiner*—Ronald Abelson
(74) *Attorney, Agent, or Firm*—Townsend and Townsend and Crew LLP

(57) ABSTRACT

A characterization method for a network address translation (NAT) device by an internal computer behind the NAT device includes creating a plurality of sockets; binding the plurality of sockets, respectively, to a plurality of ports; transmitting a plurality of STUN requests in user datagram protocol (UDP) packets to a plurality of STUN servers, wherein each STUN request is associated with one of the sockets; determining that the NAT device does not support UDP packets if responses are not received from the STUN servers; and determining a set of NAT characteristics of the NAT device if a response is received from each of the STUN servers.

28 Claims, 4 Drawing Sheets

U.S. PATENT DOCUMENTS

| | | | |
|---|---|---|---|
| 6,219,706 | B1 | 4/2001 | Fan et al. |
| 6,222,529 | B1 | 4/2001 | Ouatu-Lascar et al. |
| 6,243,749 | B1 | 6/2001 | Sitaraman et al. |
| 6,259,736 | B1 | 7/2001 | Chujoh et al. |
| 6,654,891 | B1 | 11/2003 | Borsato et al. |
| 6,693,663 | B1 | 2/2004 | Harris |
| 6,766,519 | B1 | 7/2004 | Burriss et al. |
| 6,775,276 | B1 | 8/2004 | Beser |
| 6,826,620 | B1 | 11/2004 | Mawhinney et al. |
| 6,487,316 | B1 | 1/2005 | Fukuanaga et al. |
| 6,842,484 | B2 | 1/2005 | Gandhi et al. |
| 6,845,237 | B2 | 1/2005 | Moulsley |
| 6,904,040 | B2 | 6/2005 | Salapura et al. |
| 6,973,484 | B1 | 12/2005 | Sighal et al. |
| 7,107,464 | B2 | 9/2006 | Shapira et al. |
| 7,239,662 | B2 | 7/2007 | Horowitz et al. |
| 7,272,650 | B2 | 9/2007 | Elgebaly et al. |
| 7,283,489 | B2 | 10/2007 | Palaez et al. |
| 7,302,496 | B1 | 11/2007 | Metzger |
| 7,328,280 | B2 | 2/2008 | Takeda et al. |
| 7,388,853 | B2 | 3/2008 | Ptasisnki et al. |
| 7,543,064 | B2 | 6/2009 | Juncker et al. |
| 7,564,840 | B2 | 7/2009 | Elliott et al. |
| 2002/0042283 | A1 | 4/2002 | Moulsley |
| 2002/0067405 | A1 | 6/2002 | McDiarmid |
| 2004/0015979 | A1 | 1/2004 | Shen et al. |
| 2004/0022222 | A1 | 2/2004 | Clisham |
| 2004/0022237 | A1 | 2/2004 | Elliott et al. |
| 2004/0022250 | A1 | 2/2004 | Chen et al. |
| 2004/0117653 | A1 | 6/2004 | Shapira et al. |
| 2004/0190489 | A1 | 9/2004 | Palaez et al. |
| 2005/0086289 | A1 | 4/2005 | Rosenberg et al. |
| 2005/0086358 | A1 | 4/2005 | Rosenberg |
| 2005/0108764 | A1 | 5/2005 | Rosenberg et al. |
| 2005/0117636 | A1 | 6/2005 | Rosenberg et al. |
| 2005/0117806 | A1 | 6/2005 | Rosenberg |
| 2005/0125532 | A1 | 6/2005 | Kimchi |
| 2006/0075127 | A1* | 4/2006 | Juncker et al. ............. 709/229 |

FOREIGN PATENT DOCUMENTS

| | | |
|---|---|---|
| EP | 0933948 A2 | 8/1999 |
| JP | 07095571 A | 4/1995 |
| WO | WO 0215589 A | 2/2002 |
| WO | WO 2004/064356 A2 | 7/2004 |
| WO | WO 2005/043923 A1 | 5/2005 |
| WO | WO 2005041575 A1 | 5/2005 |
| WO | WO 2005041587 A1 | 5/2005 |
| WO | WO 2005043308 A3 | 5/2005 |
| WO | WO 2005043921 A1 | 5/2005 |

OTHER PUBLICATIONS

Minturn et al. Addressing TCP/IP Processing Challenges Using the IA and IXP Processors; Intel Technology Journal, Nov. 13, 2003; pp. 39-50; vol. 7, Issue 4.

Salamon "Data Compression-The Complete Reference, Passage" Data Compression; Copyright 1997, pp. 6-10; Springer, New York, NY.

Scalable Networking: Networking Protocol Offload—Introducing TCP Chimney; WinHEC 204 Version, Apr. 9, 2004; 31 pages.

Steinbach et al, "Standard Compatible Extension of H.263 for Robust Video Transmission in Mobile Environments" Dec. 1997; vol. 7. No. 6 IEEE Transactions and Systems for Video Technology.

Transmission Control Protocol; Darpa Internet Program; Protocal Specification; RFC: 793; Sep. 1981; 84 pages.

International Search Repot for PCT/US2004/035110 mailed on Feb. 21, 2005; 3 pages.

Written Opinion for PCT/US2004/035110 mailed on Feb. 21, 2005; 6 pages.

International Search Repot for PCT/US2004/034547 mailed on Feb. 11, 2005; 1 page.

Written Opinion for PCT/US2004/034547 mailed on Feb. 11, 2005; 5 pages.

International Search Report for PCT/US/2004/34827 mailed on Feb. 6, 2006; 3 pages.

Written Opinion for PCT/US/2004/34827 mailed on Feb. 6, 2006; 3 pages.

International Search Report for PCT/US/2004/034716 mailed on Feb. 18, 2005; 1 page.

Written Opinion for PCT/US/2004/34716 mailed on Feb. 18, 2005; 3 pages.

Notice of Allowance for U.S. Appl. No. 10/833,363 mailed on Aug. 7, 2009; 4 pages.

Advisory Office Action for U.S. Appl. No. 10/833,363 mailed on Feb. 19, 2009; 6 pages.

Final Office Action for U.S. Appl. No. 10/833,363 mailed on Sep. 3, 2008; 11 pages.

Final Office Action for U.S. Appl. No. 10/833,363 mailed on Feb. 8, 2008; 12 pages.

Final Office Action for U.S. Appl. No. 10/833,363 mailed on Jul. 25, 2007; 13 pages.

Non-Final Office Action for U.S. Appl. No. 10/833,363 mailed on Dec. 21, 2006; 13 pages.

Notice of Allowance for U.S. Appl. No. 10/833,362 mailed on Sep. 9, 2009; 7 pages.

Non-Final Office Action for U.S. Appl. No. 10/833,362 mailed on Nov. 2, 2007; 10 pages.

Advisory Action for U.S. Appl. No. 10/833,362 mailed on Dec. 12, 2006; 3 pages.

Final Office Action for U.S. Appl. No. 10/833,362 mailed on Sep. 20, 2006; 14 pages.

Non-Final Office Action for U.S. Appl. No. 10/833,362 mailed on Feb. 27, 2006; 12 pages.

Notice of Allowance for U.S. Appl. No. 10/957,122 mailed on Jun. 24, 2008; 9 pages.

Notice of Allowance for U.S. Appl. No. 10/957,122 mailed on Jan. 21, 2009; 9 pages.

Non-Final Office Action for U.S. Appl. No. 10/956,480 mailed on Jan. 2, 2009; 5 pages.

Non-Final Office Action for U.S. Appl. No. 10/956,480 mailed on Mar. 7, 2008; 7 pages.

International Search Report for PCT/US2004/034726 mailed on Feb. 14, 2005; 3 pages.

Written Opinion for PCT/US2004/034726 mailed on Feb. 14, 2005; 5 pages.

Notice of Allowance for U.S. Appl. No. 10/957,074 mailed on Sep. 21, 2009; 4 pages.

Non-Final Office Action for U.S. Appl. No. 10/957,074 mailed on Jun. 12, 2009; 5 pages.

Advisory Action for U.S. Appl. No. 10/957,074 mailed on Jun. 2, 2009; 3 pages.

Final Office Action for U.S. Appl. No. 10/957,074 mailed on Dec. 16, 2008; 6 pages.

Non-Final Office Action for U.S. Appl. No. 10/957,074 mailed on May 30, 2008; 7 pages.

Non-Final Office Action for U.S. Appl. No. 10/957,070 mailed on Sep. 4, 2009; 5 pages.

Final Office Action for U.S. Appl. No. 10/957,070 mailed on Jan. 2, 2009; 6 pages.

Non-Final Office Action for U.S. Appl. No. 10/957,070 mailed on Mar. 7, 2008; 6 pages.

Yamauchi et al,"Reliable Multicast Over the Mobile Packet Radio Channel," Vehicular Technology Conference, Orlando FL USA, May 6-9, 1990, pp. 366-371, paragraph 3.2; figure 3. XP 010003594, IEEE, New York, USA.

* cited by examiner

METHOD AND APPARATUS FOR PACKET TRAVERSAL OF A NETWORK ADDRESS TRANSLATION DEVICE

BACKGROUND OF THE INVENTION

The present invention relates to communications in computer networks, and more particularly the present invention relates to a system and method for packet traversal of a network address translation device.

As the use of the Internet has grown in recent years, available internet protocol (IP) addresses for new assignments are rapidly declining. More specifically, the number of internet protocol (IP) addresses currently specified by IP version 4 (IPv4) for assignment to new Internet users is rapidly declining. IPv4 specifies the use of four bytes for each IP address. A newer IP version 6 (IPv6) that specifies 16 byte IP addressing has yet to be implemented for Internet use and is not anticipated to be implemented for the next few years.

As IPv6 is not scheduled for use within the next few years, and as available IP addresses are declining, interim solutions have been developed for increasing the number of computers that can connect to the Internet using the limited number of currently available IP addresses have been developed. One interim solution for providing computer connection to the Internet includes temporary assignment of IP addresses to connecting computers. This solution includes assigning an IP address to a computer during an Internet connection and deassigning the IP address after the Internet connection has ended.

Other interim solutions for providing computer connections to the Internet include the use of network address translation (NAT) techniques. NAT techniques include the translation of an IP address used within one network to a different IP address used within another network. One network is typically designated the internal network and typically includes a local area network (LAN), wide area network (WAN) or the like that might be used by a company, an education institute, a government agency or the like. The other network is typically designated the external network and may be a LAN, a WAN, the Internet or other network type. Current NAT techniques use three sets of internal IP addresses that are reserved for internal network use and are not used on the external network. Typically, a NAT device maps internal IP addresses in outgoing packets to one or more mapped IP addresses and un-maps the mapped IP addresses in incoming packets back into internal IP addresses. For example, as a packet leaves an internal network (e.g., a company LAN), the packet passes through the NAT device, which maps the internal IP address (e.g., 10.0.0.1) to the company's mapped IP address (e.g., 198.60.42.12).

NAT devices also typically map internal ports used by an internal computer on an internal network to external ports (sometimes referred to as mapped) used on an external network. Port translation is typically referred to as network port translation (NPT). For convenience, the term NAT as used herein includes NPT.

While NAT devices are configured to permit external network connections for a number of internal computers via a single mapped IP address, one or more of these internal computers may not know that they are "behind" a NAT device (i.e., a NAT device is communicatively coupled between the internal computers and external computers) or may not know the characteristics of the NAT device that internal computers are behind. If an internal computer does not know whether it is behind a NAT device or does not know the characteristics of the NAT device that the internal computer is behind, the internal computer may be hampered in receiving communications (e.g., packets) from external computers. For example, packets sent to the internal computer from the external computer may be dropped, as the internal computer may not be able to inform the external computer of the characteristics of the NAT device. More specifically, if the external computer uses a port that is not accepted by the NAT device, packets sent by the external computer may be dropped by the NAT device. That is, the packets will not traverse the NAT device. If alternatively, the internal computer can communicate to the external computer the characteristics of the NAT device that the internal computer is behind, then the external computers can use the information to send packets having appropriately selected IP addresses and port numbers that will permit the packets to be passed by the NAT device to the internal computer.

Thus, there is a need for a system and a method for characterizing NAT devices to provide for improved packet traversal across the NAT devices.

BRIEF SUMMARY OF THE INVENTION

The present invention provides a computer network for network communication, and more particularly provides a characterization system and characterization method for a network address translation (NAT) device by an internal computer behind the NAT device.

According to one embodiment, a method of operating the internal computer includes creating a plurality of sockets, and binding the plurality of sockets, respectively, to a plurality of ports. A plurality of STUN (simple traversal of UDP through NATs) requests are transmitted in UDP (user datagram protocol) packets to a plurality of STUN servers, wherein each STUN request is associated with one of the sockets. The internal computer concludes that the NAT device does support UDP packets if responses are not received from the STUN servers; and concludes a set of NAT characteristics of the NAT device if a response is received from each of the STUN servers.

According to a specific embodiment, the plurality of STUN servers includes at least first, second, and third STUN servers. The step of transmitting the plurality of STUN requests includes: i) transmitting a first STUN request and a second STUN request to the first STUN server; ii) transmitting a third STUN request to the second STUN server; and iii) transmitting a fourth STUN request to the third STUN server. The first STUN request is associated with a first socket of the plurality of sockets and the second, third, and fourth STUN requests are associated with a second socket of the plurality of sockets.

According to a further embodiment, the method further includes determining an incoming-packet filtering characteristic of the NAT device is exceptional if at least one response is received from the first STUN server and a response is not received from the second STUN server. According to another further embodiment, the method further includes: i) receiving a first response from the first STUN server, wherein the first response includes a first mapped port mapped by the NAT device and that is associated with the second socket; ii) receiving a second response from the second STUN server, wherein the second response includes a second mapped port mapped by the NAT device and that is associated with the second socket, iii) determining that a port-allocation behavior of the NAT device is cone if the first mapped port is the same as the second mapped port; and iv) determining that the port-allocation behavior of the NAT device is port-sensitive symmetric if the first mapped port is the same as the second mapped port.

According to one embodiment, a computer system is provided that is configured to characterize a network address translation (NAT) that the computer is behind. The computer system includes a web enabled device configured to: i) create a plurality of sockets; ii) bind the plurality of sockets, respectively, to a plurality of ports; iii) transmit a plurality of STUN requests in user datagram protocol (UDP) packets to a plurality of STUN servers, wherein each STUN request is associated with one of the sockets; iv) determine that the NAT device does support UDP packets if responses are not received from the STUN servers; and v) determine a set of NAT characteristics of the NAT device if a response is received from each of the STUN servers.

According to another embodiment, a computer system is provided that includes a first network; a first network address translation (NAT) device on the first network; at least a first web enabled device on the first network, wherein the first web enable device is operatively coupled to the first NAT device and is operatively behind the first NAT device, and the first web enabled device is configured to: i) create a plurality of sockets; ii) bind the plurality of sockets, respectively, to a plurality of ports; iii) transmit a plurality of STUN requests in user datagram protocol (UDP) packets to a plurality of STUN servers, wherein each STUN request is associated with one of the sockets; and iv) determine a set of NAT characteristics of the first NAT device if a response is received from each of the STUN servers.

A further understanding of the features and the advantages described in this summary and the following detailed description are not all-inclusive, and particularly, many additional features and advantages will be apparent to one of ordinary skill in the art in view of the specification, appended drawings, and claims.

DESCRIPTION OF SELECT EMBODIMENTS

Introduction and Overview

Headings are used herein for ease of understanding and should not be understood as limiting the described embodiments of the invention. Further, the appended figures depict a select embodiment of the invention for purposes of illustration only. One of skill in the art will readily recognize from the following discussion, claims, and appended figures that alternative embodiments of the structures and the methods disclosed herein may be employed without departing from the scope and purview of the invention.

Figure 1:
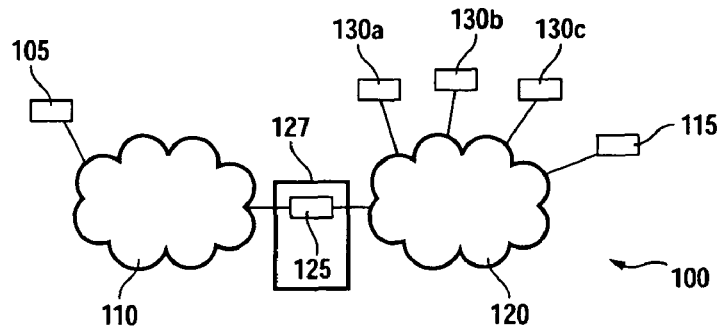
FIG. 1 is a simplified diagram of a network system according to one embodiment of the present invention.

FIG. 1 is a simplified diagram of a network system 100 according to one embodiment of the present invention. Network system 100 includes at least one internal computer 105 coupled to an internal network 110, at least one external computer 115 coupled to an external network 120, and a network address translation (NAT) device 125 that couples the internal network to the external network. The internal computer may include a personal computer, a server, a host computer, or any Web-enabled device that is configured to couple to the internal network. The internal network may include a local area network (LAN), a wide area network (WAN), a virtual LAN or the like. The external computer may include a personal computer, a server, a host computer, or any web enabled device that is configured to couple to the external network. The external network might include a LAN, a WAN, a virtual LAN, the Internet or the like.

According to one embodiment, internal computer 105 is configured to detect and characterize NAT device 125. Determination of the characteristics of the NAT device permit the internal computer and external computer to establish a peer-to-peer communication link for exchanging UDP packets. The internal computer and external computer may exchange UDP packets for peer-to-peer file transfer. Peer-to-peer generally refers to the transfer of files without the use of centralized server to which packets are uploaded and then transferred. File transfer might include the transfer of a variety of file types, such as media files (audio, video, audio/visual), text messages, voice messages (e.g., for Web telephony), and the like.

According to one embodiment, the external network includes a set of STUN (simple traversal of UDP through NATs) servers 130. STUN servers operate according to a STUN protocol are typically disposed in the Web (e.g., world wide web) for discover and characterization of devices, such as NAT devices. While the set of STUN servers is shown in FIG. 1 as including three STUN servers 130a, 130b, and 130c, as referred to herein, a set includes one or more members. STUN servers are described in further detail below. According to some embodiments, the NAT device may form a portion of another electronic system 127, such as a firewall device, a router or the like, or the NAT device may be a stand-alone device that might be coupled to a firewall device, a router or the like. According to an alternative embodiment, device 125 might be a firewall device and configured to execute the methods described herein. According the embodiment, device 127 might be housing of the firewall or might be a router that the firewall is configured to operate in conjunction with.

Figure 2:
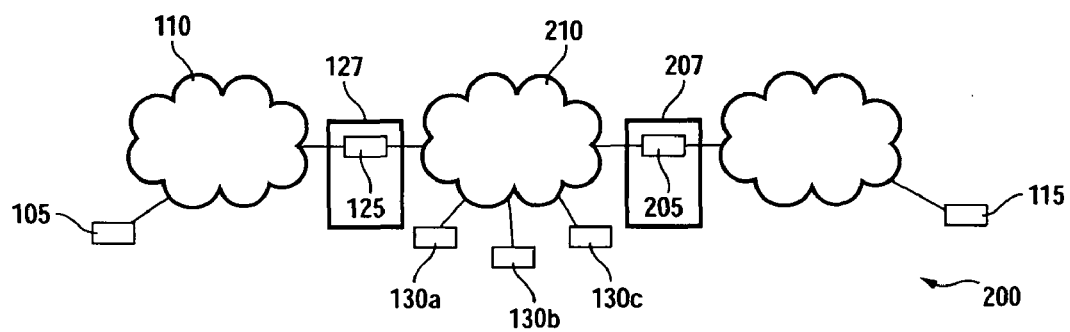
FIG. 2 is a simplified diagram of a network system according to another embodiment of the present invention.

FIG. 2 is a simplified diagram of a network system 200 according to another embodiment of the present invention. A similar numbering scheme is used to identify the same or similar elements as those shown in FIG. 1. Network system 200 differs from network system 100 in that external computer 125, similar to internal computer 105, may be behind a NAT device 205. The internal network and external network might be coupled via a network 210, such as another LAN, another WAN, the Internet or the like. The foregoing described network systems are described for illustrative purposes. Those of skill in the art will know of a plethora of network systems that are configured to operate as described below, and these other network systems are considered to be within the scope and purview of the presently described invention. According to one embodiment, one or both of the external network 120 and network 210 might include a set of STUN servers. According to some embodiments, NAT device 205 may form a portion of another electronic system 207, such as a firewall device, a router or the like, or the NAT device may be a stand-alone device that might be coupled to a firewall device, a router or the like. According to an alternative embodiment, device 205 might be a firewall device and configured to execute the methods described herein. According the embodiment, device 207 might be housing of the firewall or might be a router that the firewall is configured to operate in conjunction with.

According to one embodiment, the internal computer and/or external computer may not know whether they are behind NAT devices and/or may not know the characteristics of NAT devices that they are behind. For example, internal computer 105 might not know i) the Internet protocol (IP) address allocation behavior of NAT device 125, ii) the port-allocation behavior of the NAT device, iii) the NAT device's port-assignment behavior, and/or iv) incoming-packet filtering of the NAT device. If the internal computer does not know whether it is behind a NAT device or does not know the characteristics of the NAT device that the internal computer is behind, the internal computer may be hampered in receiving packets sent from the external computer. For example, if the internal computer and the external computer attempt to establish peer-to-peer communications, the packets sent from the external computer to the internal computer may be dropped by NAT device 125 if the foregoing described characteristics of the NAT device are unknown by these computers. Embodiments of the present invention are directed toward these problems as well as others.

Description of NAT Device Characteristics

As described briefly above, NAT devices have a variety of characteristics for i) port-allocation behavior, ii) port-assignment behavior, and iii) incoming-packet filtering. These characteristics are described in detail below. It should be understood that the described characteristics are described for exemplary purposes, and the NAT devices might have other characteristics that the computers might be configured to determine according to the methods described herein.

According to one embodiment of the present invention, the internal computer and/or the external computer are configured to determine the characteristics of their associated NAT devices and transmit information for the characteristics to the other computer so that packets sent from one computer to the other computer can traverse the other computer's NAT device without being dropped. Methods executed by the internal computer and/or the external computer to determine these characteristics are described in detail below.

Port-allocation behavior is presently described in further detail. Port-allocation behavior includes a set of rules used by the NAT device for mapping ports as packets from an internal network are sent to an external network. Three primary port-allocation behaviors are described and include: i) cone, ii) address-sensitive symmetric, and iii) port-sensitive symmetric.

Cone: Packets sent by a computer (e.g., the internal computer) from the same internal IP address and port (i.e., ip:port) are mapped to the same external ip:port by the NAT device. Mapping refers generally to the NAT device translating an IP address and/or port used by the internal computer on the internal network to an IP address and/or port used on the external network. Mapping also generally refers to the NAT device translating IP addresses and ports received from the external network to IP addresses and ports used by the internal computer on the internal network. According to the cone characteristic, packets sent from an internal ip:port, say A, to a destination computer ip:port, say D, are mapped such that A is mapped to X, wherein X is the ip:port of the NAT device. If the internal computer uses ip:port A to send a packet to a different destination ip:port, say E, the NAT device maintains the same A to X mapping. That is, the same IP address and port are used by the NAT device to send packets to both ip:port D and ip:port E. Therefore, packets returned from ip:port D and ip:port E, will traverse the NAT device (i.e., be directed by the NAT device to the internal computer at ip:port A) if the packets are sent by ip:port D and ip:port E to ip:port X. If external computers using ip:ports other than ip:port D and ip:port E attempt to send packets to the internal computer on ip:port A, the NAT device will drop these packets. IP addresses and ports are commonly referred to as sockets. More specifically, a socket is a descriptor of an IP address and a port. As is well understood in the art, each port is associated with a port number that is used to identify the port, and ports are sometimes referred to by their associated port numbers.

Address-Sensitive Symmetric: Packets sent by a computer (e.g., the internal computer) from the same internal IP address and port to the same destination IP address are mapped to the same mapped IP address and port by the NAT device. That is, if the destination IP address remains the same, but the destination port changes, the same mapping is used by the NAT device. If the destination IP address changes, a new port mapping is generated by the NAT device. For example, packets sent from the internal computer using ip:port, say A, to external ip:port, say D:M, are mapped by the NAT device such that A is mapped to X, and X is mapped to D, wherein X is the ip:port of the NAT device. An address-sensitive symmetric NAT device includes the destination IP address in the mapping but not the destination port. If the internal computer uses ip:port A to send a packet to a different destination ip:port, say D:N, the NAT device maintains the same mapping of A mapped to X, and X mapped to D. If the internal computer uses ip:port A to send a packet to a different destination ip:port, say J:K, a new mapping is created by the NAT device such that A is mapped to an ip:port, say Y, and Y is mapped to J.

Port-Sensitive Symmetric: Packets sent by a computer (e.g., the internal computer) from the same internal IP address and port to the same destination IP address and port are mapped to the same mapped IP address and port. That is, if the destination IP address or destination port changes, a new port mapping is created by the NAT device. For example, sockets for packets sent from the internal computer using ip:port A to an external computer using ip:port D:M are mapped by the NAT device such that A is mapped to X, and X is mapped to D:M, wherein X is the ip:port of the NAT device. A port-sensitive symmetric NAT device includes the destination IP address and port in the mapping. If the internal computer uses ip:port A to send a packet to a different destination ip:port D:N, a new mapping is created, wherein A is mapped to Y, and Y is mapped to D:N.

Port-assignment behavior includes a set of rules that are used by a NAT device to assign an external port mapping. Four primary port-assignment behaviors are described and include: i) incremental, ii) random, ii) internal-external incremental, and iv) internal-external random.

Incremental: A next available external port is incrementally chosen by the NAT device if a new mapping of an internal ip:port to an external ip:port is generated. For example, the NAT device may increment external ports by 1, 2, 5 or the like for new mappings. A NAT device that increments external ports is typically configured to store a table that is maintained by the NAT device to store and track the status of the external ports.

Random: A next available external port is chosen from a queue by the NAT device if a new mapping of an internal ip:port to an external ip:port is created by the NAT device. The queue includes the port numbers that may be assigned. De-assigned port numbers are returned to the queue. As the port numbers are not de-assigned in a set order, these port numbers are not entered in the queue in a set order. Thus, after a number of port numbers have been assigned, the assignment of subsequent port numbers is essentially random.

Internal-External Incremental: The internal port used by the internal computer is the same as the external port mapped by the NAT device. For example, an internal address and port might be 192.168.1.1:5000 and the external address and port mapped by the NAT device might be 64.3.3.3:5000. If the NAT device generates a new mapping for the same internal port, then the NAT device will increment the port number by a set increment, such as 1, 2, 3, etc. That is, if different external ports are generated by the NAT device for the same internal port, the incremental rule described above is applied by the NAT device to generate the external ports. For example, an initial internal address and port might be 192.168.1.1:7000, and the external address and port mapped by the NAT device might be 64.3.3.3:7000, and a subsequent mapping for the initial internal address and port 192.168.1.1:7000 might be the external address and port 64.3.3.3:7001, wherein the port 7000 is incremented by one to 7001.

Internal-External Random: The internal port is the same as the external port. Recall that the external port is the port mapped by the NAT device for use on the external network. If a new external port mapping is generated by the NAT device for the same internal port, the random rule described above is applied by the NAT device to generate the new external port mapping.

Incoming-Packet Filtering generally refers to a set of rules used by a NAT device for permitting packets to traverse from, or blocking packets from traversing from, the external computer through the NAT device to the internal computer. Three primary incoming packet-filtering behaviors include: i) no incoming packet filtering, ii) address-sensitive packet filtering, and iii) port-sensitive packet filtering.

No Incoming Packet Filtering: A NAT device that is configured not to filter incoming packets typically does not validate the computers from which incoming packets originate. That is, any external computer using an ip:port, say D, can send packets to the internal computer using ip:port, say A, by sending packets to the mapped ip:port X allocated by the NAT device.

Address-Sensitive Packet Filter: A packet filter of the NAT device that is configured to verify the IP addresses included in incoming packets to determine whether the packets should be allowed into the internal network by traversing the NAT device. Any external computer using ip:port, say D:M, can send incoming packets to the internal computer using ip:port, say A, by sending the packets to the mapped ip:port, say X, allocated by the NAT device, but only if the internal computer using ip:port A has previously sent a packet to the external computer using IP address D.

Port-Sensitive Packet Filter: A packet filter of the NAT device that is configured to verify the IP addresses and the ports included in incoming packets to determine whether the packets should be allowed into the internal network by traversing the NAT device. Any external computer using ip:port, say D:M, can send incoming packets to the internal computer using ip:port, say A, by sending the packets to the mapped ip:port, say X, allocated by the NAT device, but only if the internal computer using ip:port A has previously sent a packet to the external computer on ip:port D:M.

In addition to the foregoing described primary incoming packet filtering rules, NAT devices may be configured to use a secondary packet filtering rule that is referred to as an exceptional-packet filter. The exceptional-packet filter can be either enabled or disabled, and can be applied to an address-sensitive packet filter and/or a port-sensitive packet filter.

Exceptional Packet Filter: A packet filter of the NAT device that is configured to modify the incoming packet filter after a first packet arrives from a destination computer on ip:port, say D:M, so that only packets from D:M are allowed to traverse the NAT device and enter the internal network.

NAT Device Classification

As described briefly above, one or both of the internal computer 105 and the external computer 115 may be configured to determine the foregoing described characteristics of the respective NAT devices that these computers are behind. Further one or both of the internal computer and the external computer may be configured to determine whether they are behind a NAT device. For example, the internal computer and the external computer may by configured to determine whether they are behind the same NAT device on the same network. Information for the determined characteristics of the NAT devices (or information about the absence of a NAT device) that the internal computer and external computer are behind are sent to each other so that packets can be exchanged by these computers without the packets being dropped by the NAT devices. The transferred information is referred to herein as the port-prediction information as the internal computer and/or the external computer are configured to use the information to predict a next port that may be mapped by a NAT device. If a next mapped port is correctly predicted, the computers can send packets to the next mapped ports used by the NAT device, and the sent packets will traverse the NAT devices and reach the intended computer recipient.

Figure 3:
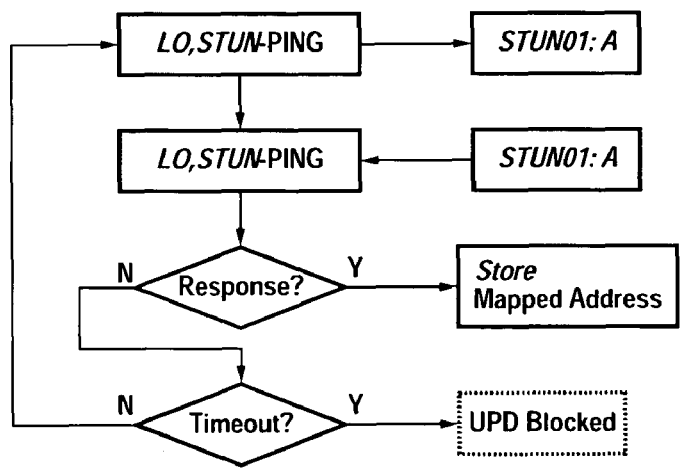
FIG. 3 is a high-level flow diagram having steps for the internal computer to determine whether it is behind a NAT device.

FIG. 3 is a high-level flow diagram having steps for the internal computer to determine whether it is behind a NAT device. While the following description discusses the execution of the flow diagram steps by the internal computer, the external computer may also be configured to execute the steps of the flow diagram to determine whether it is behind a NAT device.

According to one embodiment, the internal computer is configured to generate a socket, say L0, and bind the socket to a port. The internal IP address of L0 and the local port that is bound to L0 are stored by the internal computer. For convenience, the local port bound to L0 is referred to as the L0 port number. The port might be randomly chosen by the internal computer. For example, internal computer may chose the port between 0 and 65535. According to one embodiment, internal computer is configured to chose the port from 5000 to 65535, inclusive. If the internal computer is running the Microsoft™ Windows™ operating system, by selecting a port of 5000 or above, the Windows™ operating system will similarly choose ports of 5000 or above. Subsequent to generating the socket L0 and selecting the port, the internal computer is configured to send a STUN request (step 300) to STUN server 130a. The STUN request may be sent according to the user datagram protocol (UDP) or other protocols that will be readily known by those of skill in the art.

Generally, a STUN server is configured to send back a response (step 305) to an internal computer that sends a stun request to the STUN server. The response includes the mapped IP address and the mapped port from which the STUN request was sent. Thus that, the response includes the mapped IP address and mapped port, mapped by the NAT device from the internal IP address and port used by the computer sending the STUN request.

After the STUN request is sent to the STUN server from the internal computer, the internal computer is configured to wait for the STUN server's response. If a response is received from the STUN server, the mapped IP address and mapped port are stored by the internal computer (step 310). For convenience, the mapped port for the L0 socket is referred to herein as the E0 port number. In further response to receiving the response from the STUN server, the internal computer is configured to set an internal flag that indicates that the NAT device supports UDP packets or other packet types used for the characterization.

The internal computer is configured to compare the internal IP address to the mapped IP address (step 320). If internal IP address and the mapped IP address are the same, the internal computer is configured to conclude that it is not behind a NAT device. Otherwise, if the internal IP address and mapped IP address are different, the internal computer is configured to conclude that it is behind a NAT device. Specifically, if these IP addresses are different, the internal computer can conclude that the NAT device has mapped the internal IP address used by the internal computer to the mapped IP address (sometimes referred to as an external IP address) used by the NAT device on the external network.

Alternatively, if the internal computer does not receive a response from the STUN server in a predetermined-time interval (e.g., within about, or approximately at, 250 milliseconds), the internal computer is configured to resend the STUN request (step 300). The STUN request might be repeatedly sent to the STUN server at the predetermined-time interval for a predetermined-time period (e.g., 3 second). If after the predetermined-time period a response is not received from the STUN server, the local computer is configured to conclude that the NAT device does not have UDP network capabilities (step 325). That is, UDP packets are blocked by the NAT device. If the internal computer concludes that the NAT device does not support UDP packets, the characterization of the NAT device is halted. The internal computer might be configured to set an internal flag to indicate that the NAT device does not support UDP packets (e.g., UPD supported=false) or other packet types used for the characterization process. If a response is received from the STUN server within the predetermined time period, the above storage step 310 and comparison step 315 are executed by the internal computer.

According to one embodiment, the steps of the flow diagram may be repeated by the internal computer using another socket, say L1, generated by the internal computer. The internal computer may be configured to bind a new port, say the L1 port number, to the L1 socket. The L1 port number may be randomly generated by the internal computer. The internal IP address and the L1 port number of socket L1 may stored by the internal computer. If the internal computer does not receive a response to the STUN request sent to STUN server 130*a* within the predetermined-time period, the internal flag is set to indicate that the NAT device does not support UDP packets (e.g., UPD supported=false) or other packets types used by the internal computer to characterize the NAT device that are then used by the internal computer. If the internal computer receives a response from the STUN server, the internal flag is set by the internal computer to indicate that the NAT device supports UDP packets (e.g., UPD supported=true) or other packet types used by the internal computer. Also, the mapped IP address and mapped port returned to the internal computer in the response by the STUN server are stored by the internal computer. For convenience, the mapped port for the L0 socket is referred to as the E1 port number.

According to one embodiment, the internal computer is configured to compare the E0 port number and the E1 port number to determine whether the mapped ports assigned by the NAT device are incremental or random. Incremental and random port assignment are described above in detail.

Figure 4:
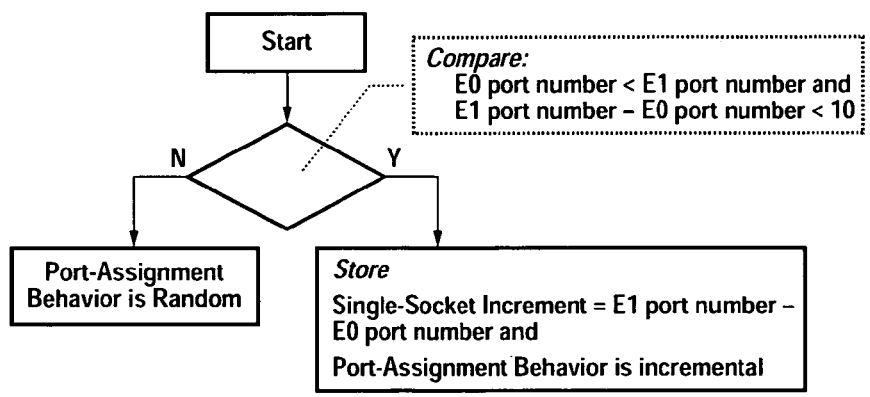
FIG. 4 is a high-level flow diagram having steps that provide an overview of the determination of whether the mapped ports assigned by the NAT device are incremental or random.

FIG. 4 is a high-level flow diagram having steps that provide an overview of the foregoing described comparison. At 400, the internal computer determines whether the E0 port number is less than the E1 port number, and calculates the difference between the E1 port number and the E0 port number. If the E0 port number is less than the E1 port number, and the difference between the E1 port number and the E0 port number is less than a select-port increment (e.g., 20, 10, 5 or the like) then the internal computer is configured to determine that the NAT device assigns port incrementally (described above in detail), otherwise the NAT device is determined to assign ports randomly. The internal computer is configured to set a flag (e.g., the between-sockets-port-assignment behavior) to indicate that the NAT device is configured to assign ports incrementally or random depending on the result of the foregoing described comparison (e.g., between-sockets-port-assignment behavior=incremental or random).

Subsequent to determining whether the NAT device assigns ports randomly or incrementally, the internal computer is configured to determine whether the NAT device assigns port as internal-external incremental or as internal-external random (internal-external characteristics of NAT devices are described above in detail).

Figure 5:
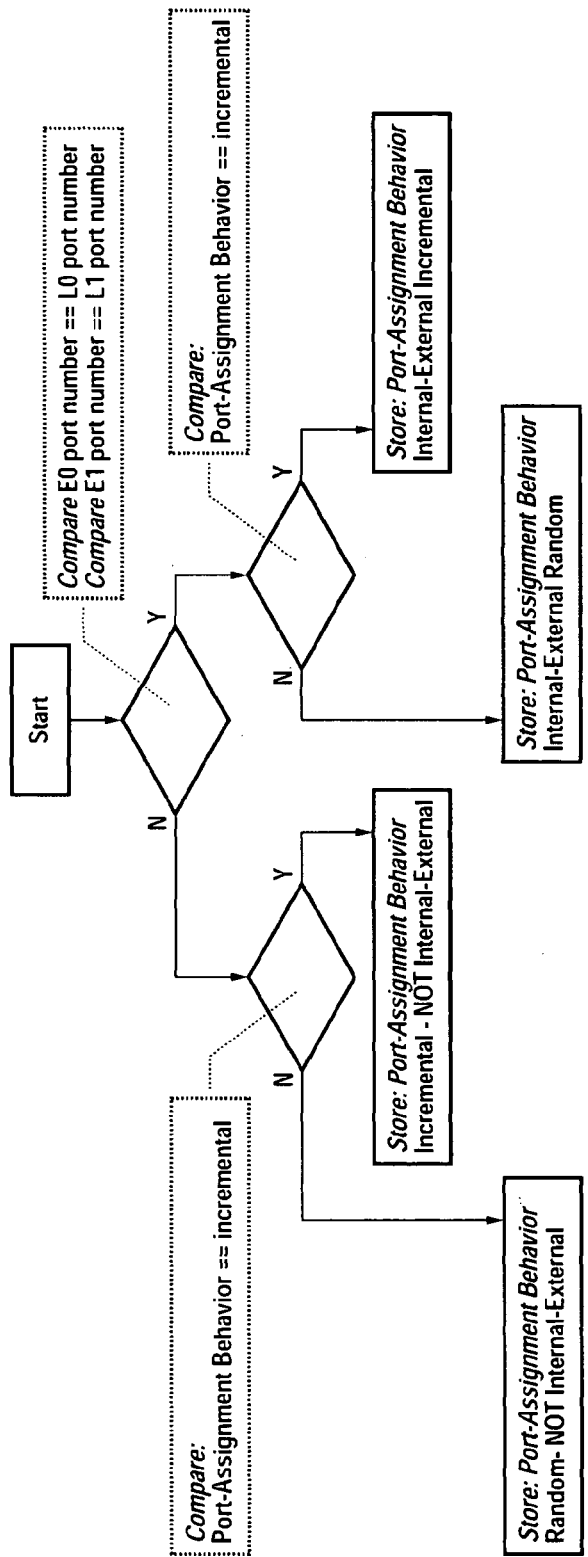
FIG. 5 is a high-level flow diagram having steps that provide an overview of the determination of whether the NAT device assigns ports internal-external incremental or internal-external random.

FIG. 5 is a high-level flow diagram having steps that provide an overview of the foregoing described determination of the NAT device characteristics. At 500, the internal computer is configured to determine whether the E0 port number and the L0 port number are the same, and whether the E1 port number and the L1 port number are the same. If these ports are the same, at 505 the internal computer reviews whether the port-assignment behavior for sequentially assigned sockets is incremental. If these ports are the same, and the port-assignment behavior is incremental, then the internal computer (step 510) is configured to conclude that the port-assignment behavior of the NAT device is internal-external incremental (described above in detail). Alternatively, if these ports are the same, but the port-assignment behavior is random, the internal computer (step 515) is configured to conclude that the port-assignment behavior is internal-external random (described above in detail). If the E0 port number and the L0 port number, and/or E0 port number and the E1 port number are not the same, the internal computer (step 520) is configured to conclude that the port-assignment behavior is random and not internal-external incremental (step 525), or incremental and not internal-external random (step 530). The between-sockets-port-assignment behavior may be revised by the internal computer to reflect the results of the foregoing described comparisons. For example, the between-sockets-port-assignment behavior may be set to internal-external random or internal-external incremental depending on the results of the comparisons.

According to one embodiment, following the STUN request sent for the L0 and L1 socket to STUN server 130*b*, the internal computer is configured to send a STUN request to STUN server 130*b*, using, for example, socket L1 according to the steps of the flow diagram of FIG. 3. If the internal computer does not receive a response from STUN server 130*b* in the predetermined-time period, the internal computer is configured to conclude that the NAT device is an exceptional NAT device (described above in detail). Information for this characteristic of the NAT device is stored by the internal computer (e.g., exceptional=true). If a response is received from the STUN server, the internal computer is configured to store the mapped port returned in the response. This mapped port is referred to as the E2 port number.

According to a further embodiment, the internal computer is configured to send another STUN request to STUN server 130c, using, for example, socket L1, according to the steps of the flow diagram of FIG. 3. If the internal computer does not receive a response from STUN server 130c in the predetermined time period, the internal computer is configured to confirm that the NAT device is an exceptional NAT device. If a response is received from the STUN server, the internal computer is configured to store the mapped port returned in the response. This mapped port is referred to as the E3 port number.

Figure 6:
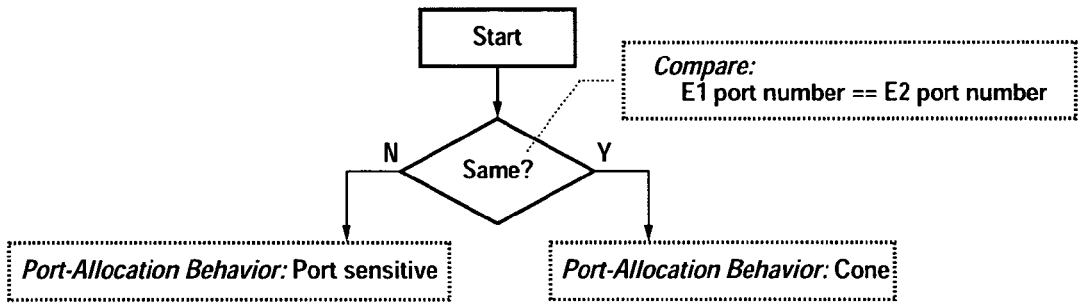
FIG. 6 is high-level flow diagram having steps for further characterization of the NAT device by the internal computer.

FIG. 6 is high-level flow diagram having steps for further characterization of the NAT device by the internal computer. At 600, if the NAT device is determined to be an exceptional NAT device, then the internal computer is configured to stop characterizing the NAT device, and the port-allocation behavior and port-assignment behavior are concluded to be unknown. The flags associated with the characteristics might be set to reflect these unknown characteristics of the NAT device. At 605, the internal computer is configured to compare the E1 port number and the E2 port number. If these port numbers are the same (610), the port-allocation behavior of the NAT device is determined to be cone (described above in detail). If these port numbers are not the same (615), the port-allocation behavior is determined to be port sensitive.

Figure 7:
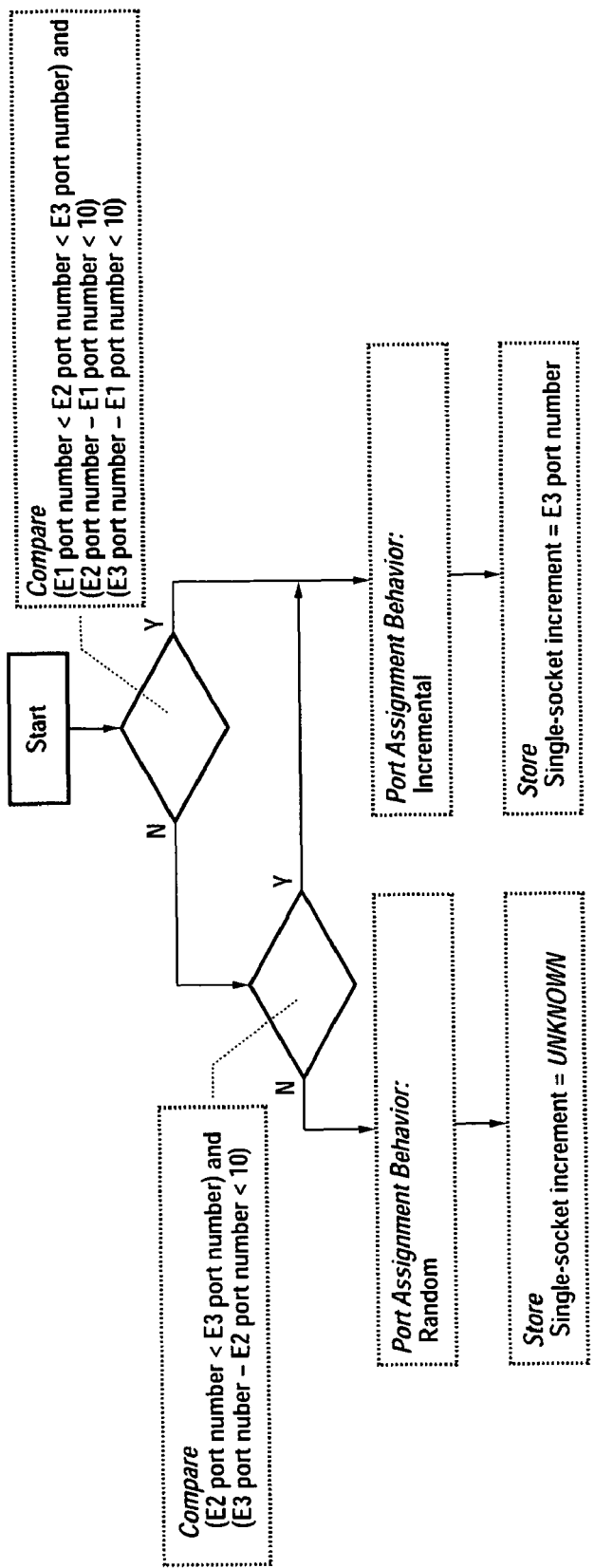
FIG. 7 is a high-level flow diagram having steps for the internal computer to determine the single-socket increment between sequential sockets.

FIG. 7 is a high-level flow diagram having steps for the internal computer to determine the single-socket increment between sequential sockets. That is, the steps are executed by the internal computer to determine the value of the increment (e.g., 1, 5, 10, etc.) of the sequentially mapped ports mapped by the NAT device. At 700, the internal computer is configured to determine whether:

i) the E1 port number is less than the E2 port number,
   ii) the E2 port number is less than the E3 port number,
   iii) the difference between the E1 port number and the E2 port number is less than a select-port increment (e.g., 20, 10, 5 or the like), and
   iv) the difference between the E2 port number and the E3 port number is less than the select-port increment (e.g., 20, 10, 5 or the like).

If the internal computer derives a positive finding from the above four comparisons, the internal computer is configured to confirm that the NAT device maps external ports incrementally (step 705). Further, the internal computer is configured to set the single-socket increment for sequential sockets as the E3 port number minus the E2 port number (step 710). If the internal computer derives a negative finding from one or more of the above four comparisons, at 715, the internal computer is configured to determine whether i) the E2 port number is less than the E3 port number, and
   ii) the difference between the E2 port number and the E3 port number is less than the select-port increment (e.g., 20, 10, 5 or the like).

If the internal computer derives a positive finding from the two foregoing comparisons, the internal computer confirms that the NAT device maps external ports incrementally (step 705). Further, the internal computer is configured to set the single-socket increment for sequential sockets to the E3 port number minus the E2 port number (step 710). If the internal computer derives a negative finding from one or both of the two foregoing comparisons, the internal computer is configured to conclude that the NAT device maps ports randomly (step 720), and sets the single-socket increment as unknown (step 725).

Subsequent to executing one or more of the foregoing described determinations of the characteristics of the NAT device, the internal computer is configured to set a number of internal flags and set a number of internal variables according to the determinations of the characteristics. The internal flags and internal variables are referred to as the port-prediction information. The port-prediction information includes:

i) the UDP-predicted-external-port number,
   ii) the UDP-predicted-internal-port number,
   iii) the mapped-IP address,
   iv) the internal-IP address,
   v) the single-socket increment,
   vi) the port-allocation behavior (e.g., cone, port-sensitive symmetric, etc.), and
   vii) the UPD-predicted socket.

The UDP-predicted-external-port number is a next mapped port that the internal computer predicts that the NAT device will create. The UPD-predicted-internal-port number is the next port that the internal computer predicts it will create. The mapped-IP address is used by the NAT device on the external network. The internal-IP address is used by the internal computer on the internal network. The single-socket increment is the predicted increments between sequentially mapped ports and/or sequentially mapped IP addresses created by the NAT device. The port-allocation behaviors are described above in detail. The UPD-predicted socket is the predicted socket that the internal computer will use.

Eight alternative sets of port-prediction information are described below. Once the port-prediction information is determined by the internal computer, the internal computer may be configured to transfer port-prediction information to the external computer so that the external computer can use the information to send packets to a mapped port for which the packets will traverse the NAT device. Transmission of the port-prediction information is described in detail below.

According to a first embodiment of the port-prediction information, if the internal computer determines that the NAT device does not support UDP packets or other packets used to characterize the NAT device, the internal computer is configured to conclude that a UDP peer-to-peer connection with the external computer is not possible and may be configured to establish another method of communication with the external computer.

According to a second embodiment of the port-prediction information, if the internal computer determined that it is not behind a NAT device and the NAT device is an exceptional NAT device, the internal computer is configured to generate a new socket, say L2, and bind the socket to a random port (e.g., a port between 5000 and 65535). The internal computer then stores the local port number that was bound to socket L2, for example, as L2 port number. Further, the internal computer is configured to set the UDP predicted external port number to the L2 port number as no NAT device is disposed so as to map the L2 port number to a mapped port number. The internal computer is further configured to set the UDP-predicted-internal-port number to the L2 port number.

According to a third embodiment of the port-prediction information, if the internal computer determined that it is not behind a NAT device, and the NAT device is not an exceptional NAT device, then the internal computer is configured to set the UDP-predicted-external-port number to the L1 port number, and is configured to set the UDP-predicted-internal-port number to the L1 port number.

According to a fourth embodiment of the port-prediction information, if the internal computer determined that it is behind a NAT device, and the NAT device has port-allocation behavior that is cone, then the internal computer is configured to set the UDP-predicted-external-port number to the E1 port number, set the UDP-predicted socket to the L1 socket, and set the UDP-predicted-internal-port number to the L1 port number.

According to a fifth embodiment of the port-prediction information, if the internal computer determined that it is behind a NAT device, the NAT device has port-allocation behavior that is not cone, and the between-sockets port assignment behavior is internal-external, then the internal computer is configured to generate a new socket, say L2, and bind the socket L2 to a port number (e.g., a random port number), say the L2 port number, which the internal computer is configured to store. The internal computer is then configured to set the UDP-predicted-external-port number to the L2 port number, set the UDP-predicted socket as L2, and set the UDP-predicted-internal-port number to the L2 port number.

According to a sixth embodiment of the port-prediction information, if the internal computer determined that it is behind a NAT device, the NAT device has port-allocation behavior that is not cone, the port-assignment behavior is incremental and not internal-external, then the internal computer is configured to predict the next mapped port that will be created by the NAT device.

To elaborate, if the difference between the E1 port number and the E2 port number is the same as the difference between the E2 port number and the E3 port number, then the internal computer is configured to set the UDP-predicted-external-port number to the E3 port number plus the single-socket increment (i.e., the E3 port number minus the E2 port number). Further, the internal computer is configured set the UDP-predicted-socket to L1, and set the UDP-predicted-internal-port number to the L1 port number.

Alternatively, if the difference between the E1 port number and the E2 port number is not the same as the difference between the E2 port number and the E3 port number, then the internal computer is configured to set the UDP-predicted-external-port number to the E3 port number plus the single-socket increment (i.e., the E3 port number minus the E2 port number). Further, the internal computer is configured to set the UDP-predicted socket to the L1 socket, and set the UDP-predicted-internal-port number to the L1 port number.

According to a seventh embodiment of the port-prediction information, if the internal computer determined that it is behind a NAT device, the NAT device has port allocation behavior that is not cone, the port-assignment behavior is incremental and not internal-external, then the internal computer is configured to generate a new socket, say L2, and bind the new socket to a port number (e.g., a random port number), say the L2 port number, which the internal computer is configured to store. The internal computer is then configured to set the UDP-predicted-external-port number to the E1 port number plus the single-socket increment (i.e., the E3 port number minus the E2 port number), set the UDP-predicted socket to L2, and set the UDP-predicted-internal-port number to the L2 port number.

According to an eighth embodiment of the port-prediction information, if the internal computer determined that it is behind a NAT device, the NAT device has port allocation behavior that is not cone, the port-assignment behavior is not incremental and not internal-external, then the internal computer is configured to set the UDP-predicted-external-port number to the E0 port number, set the UDP-predicted socket to L0, and set the UDP-predicted-internal-port number to the E0 port number.

According to one embodiment, the internal computer is configured to transmit the port-prediction information to the external computer to establish a UDP peer-to-peer communication link with the external computer. The port-prediction information may be transferred through a back-channel between the internal computer and the external computer to provide that the port-prediction information will not be blocked by the NAT device associated with the external computer. The back-channel is a communication device that links two peers via a communication link (may be wired or wireless). The back-channel is typically hosted by a server. Both peers may be linked via a communication link to the server, which facilitates the transfer of the port-prediction information. The port-prediction information may be used by the external computer to determine whether the internal computer is behind a NAT device, or to predict the next port that will be created by the NAT device to send packets to the predicted port. Subsequent to receiving the port-prediction information or before receiving this information, the external computer may be configured to determine the characteristics of the NAT device, such as NAT device 205, that the external computer is behind. The external computer may execute the steps of one or more of the foregoing high-level flow diagrams to determine the characteristics or existence of the NAT device. The external computer may then set a set of internal flags and internal variables (i.e., port-prediction information), and transmit this port-prediction information to the internal computer.

According to one embodiment, if from the received port-prediction information the internal computer and external computer determine that they have the same mapped IP address, then both the internal computer and external computer are behind the same NAT device. These computers will then be configured to use the UDP predicted internal port number for packet sharing. According to the foregoing described embodiment, if the packets traverse the NAT devices, a peer-to-peer communication link is established between the internal and external computers.

According to an alternative embodiment, if the external computer determines that the internal computer is behind a NAT device that has cone port-allocation behavior, then the port used by the external computer to send packets to the internal computer is the UDP-predicted-external-port number. The internal computer may be similarly configured to send packets to the UPD-predicted-port number of the NAT device that the external computer is behind. According to the foregoing described embodiment, if the packets traverse the NAT devices, a peer-to-peer communication link is established between the internal and external computers.

Alternatively, if the external computer determines that the internal computer is behind a symmetric NAT device, the external computer may be configured to send packets to the internal computer using a plurality of different ports based on the single-socket increment received by the external computer in the port-prediction information received from the internal computer. For example, the external computer may by configured to send five packets to the internal computer via five different ports. The five different ports might include the UDP-predicted-external-port number plus the single-socket increment, the UDP predicted external port number plus two times the single-socket increment, the UDP predicted external port number plus three times the single-socket increment, etc. The internal computer may be similarly configured to send a number of packets to the external computer using increments of a predicted port number. According to the foregoing described embodiment, if the packets traverse the NAT devices, a peer-to-peer communication link is established between the internal and external computers.

It is to be understood that the examples and embodiments described above are for illustrative purposes only and that various modifications or changes in light thereof will be suggested to persons skilled in the art and are to be included within the spirit and purview of this application and scope of the appended claims. For example, firewall devices described herein may be configured to operate substantially similarly to the variously described NAT devices although the firewall devices may not be configured to perform network address translation and may or may not be configured to perform port address translation. The functions of firewall devices are well understood by those of skill in the art and will not be described in detail herein except to note that firewall devices are configured to operate at the network level, application-layer level, and the like to block packets from passing through the firewall unless they match a set of rules. A firewall administrator may define the set of rules or the set of rules might be a default set of rules. The rules might include the packet filtering rules described herein (e.g., the exceptional rule). According to a further example, one or more NAT devices described herein might be configured to operate in conjunction with one or more firewall devices to perform NAT and to provide firewall filtering. The interoperation of NAT devices and firewall devices are well understood by those of skill in the art and will not be described in further detail herein. Therefore, the above description should not be taken as limiting the scope of the invention as defined by the claims.

What is claimed is:

1. A characterization method for a network address translation (NAT) device by an internal computer behind the NAT device, the method comprising:
   creating a plurality of sockets;
   binding the plurality of sockets, respectively, to a plurality of ports;
   transmitting a plurality of STUN requests in user datagram protocol (UDP) packets to a plurality of STUN servers, wherein each STUN request is associated with one of the sockets;
   determining that the NAT device does not support UDP packets if responses are not received from the STUN servers; and
   determining a set of NAT characteristics of the NAT device if a response is received from each of the STUN servers.

2. The method of claim 1, wherein the plurality of responses includes at least a first response and a second response that is received after the first response.

3. The method of claim 2, further comprising:
   determining a port assignment behavior of the NAT device is incremental if a first mapped port received in the first response is less than a second mapped port received in the second response and if the second mapped port minus the first mapped port if less than a select number; and
   determining that the port assignment behavior of the NAT device is random if the first mapped port is greater than or equal to the second mapped port and/or if the first mapped port minus the second mapped port if greater than or equal to the select number.

4. The method of claim 3, wherein the plurality of sockets includes a least a first socket and a second socket that are respectively associated with a first port and a second port that are included in the plurality of ports.

5. The method of claim 4, further comprising:
   determining a port assignment behavior of the NAT device is internal-external incremental if the port assignment behavior of the NAT device is incremental, if the first mapped port is the same as the first port, and if the second mapped port is the same as the second port; and
   determining a port assignment behavior of the NAT device is internal-external random if the port assignment behavior of the NAT device is random, if the first mapped port is the same as the first port, and if the second mapped port is the same as the second port.

6. The method of claim 1, wherein:
   the plurality of STUN servers includes at least first, second, and third STUN servers, and
   the step of transmitting the plurality of STUN requests includes:
      transmitting a first STUN request and a second STUN request to the first STUN server;
      transmitting a third STUN request to the second STUN server; and
      transmitting a fourth STUN request to the third STUN server,
      wherein the first STUN request is associated with a first socket of the plurality of sockets and the second, third, and fourth STUN requests are associated with a second socket of the plurality of sockets.

7. The method of claim 6, further comprising determining an incoming-packet filtering characteristic of the NAT device is exceptional if at least one response is received from the first STUN server and a response is not received from the second STUN server.

8. The method of claim 6, further comprising:
   receiving a first response from the first STUN server, wherein the first response includes a first mapped port mapped by the NAT device and that is associated with the second socket;
   receiving a second response from the second STUN server, wherein the second response includes a second mapped port mapped by the NAT device and that is associated with the second socket;
   determining that a port-allocation behavior of the NAT device is cone if the first mapped port is the same as the second mapped port; and
   determining that the port-allocation behavior of the NAT device is port-sensitive symmetric if the first mapped port is not the same as the second mapped port.

9. The method of claim 8, further comprising
   receiving a third response from the third STUN server, wherein the third response includes a third mapped port mapped by the NAT device and that is associated with the second socket
   setting a single-socket increment to the difference between second mapped port and the third mapped port,
      if the first mapped port is less than the second mapped port,
      if the second mapped port is less than the third mapped port, and
      if the difference between the first mapped port and the second mapped port is less than a select-port increment.

10. The method of claim 9, further comprising
    receiving a third response from the third STUN server, wherein the third response includes a third mapped port mapped by the NAT device and is associated with the second socket
    setting a single-socket increment to difference between second mapped port and the third mapped port, if the second mapped port is less than the third mapped port, and if the difference between the second mapped port and the third mapped port is less than a select-port increment.

11. The method of claim 10, further comprising transmitting through a back-channel a set of port prediction information to an external computer, wherein the port prediction information includes one or more of the single-socket increment, the port-allocation behavior, the first port, the second port, the first mapped port, the second mapped port, and the third mapped port.

12. The method of claim 11, further comprising:
the external computer predicting a set of next ports to be selected by the NAT based on one or more elements included in the set of NAT characteristics; and
transmitting a set of packets from the external computer to the NAT device and internal computer using the next ports.

13. The method of claim 11, further comprising:
if the port-allocation behavior is cone, sending packets from the external computer to the internal computer via the first mapped port.

14. The method of claim 11, further comprising if the port-allocation behavior is address-sensitive symmetric or port-sensitive symmetric, sending packets from the external computer to the internal computer via an IP address of the internal computer and a plurality of predicted ports that are increments of a last port mapped by the NAT device, wherein the increments include multiples of the single-socket increment.

15. The method of claim 14, wherein if at least one of the packets traverses the NAT device to the internal computer, a peer-to-peer connection between the internal computer and external computer is established.

16. The method of claim 1, further comprising transmitting through a back-channel the set of NAT characteristics to an external computer.

17. The method of claim 16, further comprising:
the external computer predicting a set of next ports to be mapped by the NAT based on the set of NAT characteristics; and
transmitting a set of packets from the external computer to the NAT device and the internal computer via the next ports.

18. A computer system configured to characterize a network address translation (NAT) device such that the computer is coupled to the NAT device via an internal network and the computer is behind the NAT device, the computer system comprising:
a web enabled device configured to:
create a plurality of sockets;
bind the plurality of sockets, respectively, to a plurality of ports;
transmit a plurality of STUN requests in user datagram protocol (UDP) packets to a plurality of STUN servers, wherein each STUN request is associated with one of the sockets;
determine that the NAT device does not support UDP packets if responses are not received from the STUN servers; and
determine a set of NAT characteristics of the NAT device if a response is received from each of the STUN servers.

19. A computer system comprising:
a first network;
a first network address translation (NAT) device on the first network;
at least a first web enabled device on the first network, wherein
the first web enable device is operatively coupled to the first NAT device and is operatively behind the first NAT device, and
the first web enabled device is configured to:
create a plurality of sockets;
bind the plurality of sockets, respectively, to a plurality of ports;
transmit a plurality of STUN requests in user datagram protocol (UDP) packets to a plurality of STUN servers, wherein each STUN request is associated with one of the sockets; and
determine a set of NAT characteristics of the first NAT device if a response is received from each of the STUN servers.

20. The computer system of claim 19, further comprising:
a second network operatively coupled to the NAT device; and
at least a second web enabled device coupled to the second network and configured to receive the set of NAT characteristics from the first web enabled device, wherein
based on the NAT characteristics the second web enabled device is configured to predict a set of next-mapped ports mapped by the first NAT device, and send a set of packets to the first NAT device on the set of next-mapped ports,
if one of the packets is sent to a next-mapped port mapped by the NAT device, this packet is configured to traverse the NAT device.

21. The computer system of claim 20, further comprising:
a second NAT device on the second network, wherein
the second web enable device is behind the second NAT device, and
the second web enabled device is configured to:
create another plurality of sockets;
bind the other plurality of sockets, respectively, to another plurality of ports;
transmit another plurality of STUN requests in user datagram protocol (UDP) packets to a plurality of STUN servers, wherein each STUN request is associated with one of the other sockets; and
determine a set of NAT characteristics of the second NAT device if a response is received from each of the STUN servers.

22. The computer system of claim 21, further comprising a third network disposed between the first NAT device and the second NAT device.

23. The computer system of claim 22, wherein the third network is the Internet.

24. The computer system of claim 23, further comprising a plurality of STUN servers operatively coupled to the second network and configured to receive the STUN requests.

25. A characterization method for a firewall device by an internal computer behind the firewall device, the method comprising:
creating a plurality of sockets;
binding the plurality of sockets, respectively, to a plurality of ports;
transmitting a plurality of STUN requests in user datagram protocol (UDP) packets to a plurality of STUN servers, wherein each STUN request is associated with one of the sockets;
determining that the firewall device does not support UDP packets if responses are not received from the STUN servers; and determining a set of firewall characteristics of the firewall device if a response is received from each of the STUN servers.

26. The method of claim 25, wherein the plurality of responses includes at least a first response and a second response that is received after the first response.

27. A computer system comprising:
a first network;
a firewall device on the first network;
at least a first web enabled device on the first network, wherein
the first web enable device is operatively coupled to the firewall device and is operatively behind the firewall device, and
the first web enabled device is configured to:
  create a plurality of sockets;
  bind the plurality of sockets, respectively, to a plurality of ports;
  transmit a plurality of STUN requests in user datagram protocol (UDP) packets to a plurality of STUN servers, wherein each STUN request is associated with one of the sockets; and
determine a set of firewall characteristics of the firewall device if a response is received from each of the STUN servers.

28. The computer system of claim 27, further comprising:
a second network operatively coupled to the firewall device; and
at least a second web enabled device coupled to the second network and configured to receive the set of firewall characteristics from the first web enabled device, wherein
based on the firewall characteristics the second web enabled device is configured to predict a set of next-mapped ports mapped by the firewall device, and send a set of packets to the firewall device on the set of next-mapped ports,
if one of the packets is sent to a next-mapped port mapped by the firewall device, this packet is configured to traverse the firewall device.

* * * * *